United States Patent
Proudfoot

(10) Patent No.: US 9,092,784 B2
(45) Date of Patent: Jul. 28, 2015

(54) CONTACTS AFFINITY USED TO PRIORITIZE DISPLAY OF CONTENT ITEM REVIEWS IN ONLINE STORE

(75) Inventor: Ryan Brock Proudfoot, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 474 days.

(21) Appl. No.: 13/584,456

(22) Filed: Aug. 13, 2012

(65) Prior Publication Data

US 2014/0046801 A1 Feb. 13, 2014

(51) Int. Cl.
*G06Q 30/00* (2012.01)

(52) U.S. Cl.
CPC ...................... *G06Q 30/00* (2013.01)

(58) Field of Classification Search
CPC ............. G06Q 30/0633; G06Q 30/02; G06Q 30/0601; G06Q 30/0631
USPC .................................. 705/26.1, 27.1
See application file for complete search history.

(56) References Cited

U.S. PATENT DOCUMENTS

| | | |
|---|---|---|
| 2009/0070228 A1 | 3/2009 | Ronen |
| 2009/0210391 A1 | 8/2009 | Hall et al. |
| 2011/0035329 A1* | 2/2011 | Delli Santi et al. ........... 705/347 |
| 2011/0153451 A1 | 6/2011 | Bitz et al. |
| 2011/0178885 A1 | 7/2011 | Xiong |
| 2012/0158551 A1* | 6/2012 | Gonsalves et al. ........... 705/27.2 |

OTHER PUBLICATIONS

My2cents: enabling research on consumer-product interaction; Karpischek, Stephan; Michahelles, Florian, Fleish, Elgar Published online Aug. 2, 2011.*

"European Application Serial No. 12180348.0, Examination Notification Art. 94(3) mailed Aug. 22, 2013, 7 pgs".

"European Application Serial No. 12180348.0, Extended Search Report mailed Nov. 15, 2012", 7 pgs.

"European Application Serial No. 12180348.0, Response filed Aug. 1, 2013 to European Search Report mailed Nov. 15, 2012", 3 pgs.

* cited by examiner

*Primary Examiner* — Courtney Stopp

(74) *Attorney, Agent, or Firm* — Jon Gibbons; Fleit Gibbons Gutman Bongini & Bianco P.L.

(57) ABSTRACT

A method is provided to display on an electronic device, prioritized reviews of content items offered in an online storefront; contact information associated the device includes social affinity information; contacts of the user of the device are matched to reviews of the content item within a content item database associated with the online storefront; social affinity between reviewers, who have a match user contacts, and the user of the device is used to prioritize the reviews; reviews are displayed on the electronic device UI with an indication of their priority based upon social affinity between the reviewer and the user of the device.

19 Claims, 9 Drawing Sheets

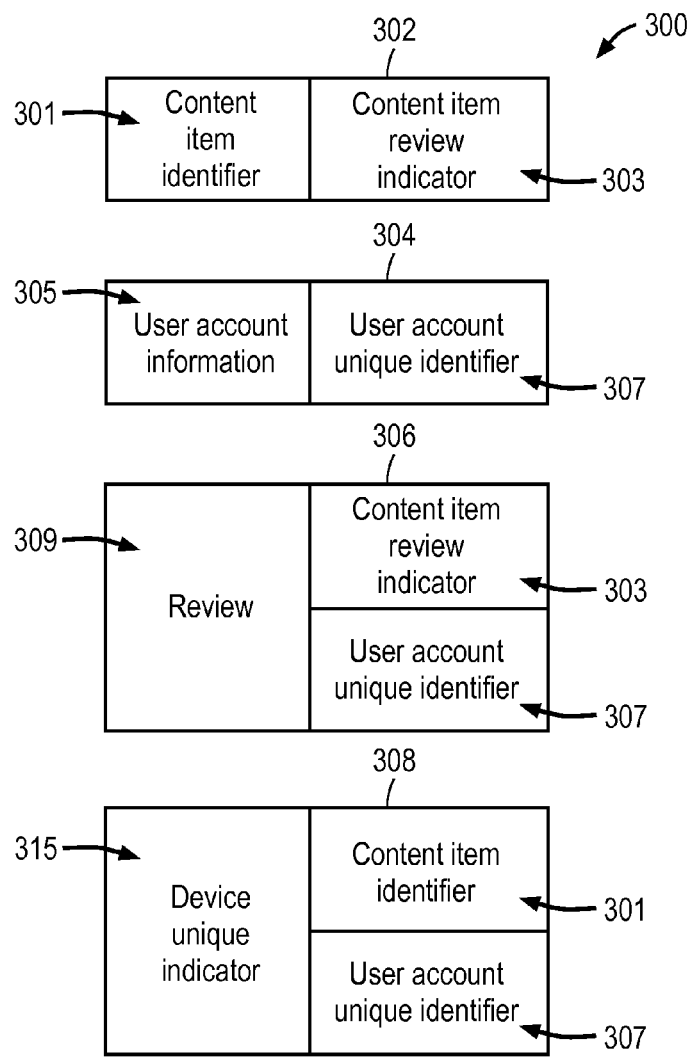

FIG. 7A   FIG. 7B   FIG. 7C

CONTACTS AFFINITY USED TO PRIORITIZE DISPLAY OF CONTENT ITEM REVIEWS IN ONLINE STORE

FIELD OF THE INVENTION

The invention relates in general to electronic commerce, and more particularly, to using social affinity information to improve online shopping experience.

BACKGROUND

Online storefronts often provide reviews about items that are offered for sale. One problem with online reviews is that most of them are written by strangers with whom a potential purchaser has no trust relationship. Reviews written by people known to a potential purchaser are likely to have more influence upon that person's decision-making than those by people who they do not know or trust. The advent of widespread online social networks and online shopping creates opportunities for online shoppers to seek input online from persons who they trust about items such as songs, videos, games and books before deciding whether to make a purchase.

Online shopping is a form of electronic commerce in which a consumer acquires goods or services from a seller over the internet. An online storefront often is implemented using an application that runs on a user device to provide a user interface (UI) that provides an online storefront experience and that communicates with a web server. The web server provides information for display by the user device, which allows a user to browse through the store and to download or purchase items.

A server is a computer or program configured to supply data or resources to other machines on a network. The basic architecture of the internet is relatively simple: web clients running on users' machines, e.g., mobile devices use HTTP (Hyper Text Transport Protocol) to request objects from web servers. The server processes the request and sends a response back to the client. HTTP is built on a client-server model in which a client makes a request of the server. A web server often is implemented using multiple physical or virtual computers that work cooperatively to retrieve and deliver information used to generate display information such as web pages for display on user devices upon request.

SUMMARY

In some embodiments, a method is provided to display on an electronic device, prioritized reviews of content items offered in an online storefront. Contact information associated with a user of the device includes social affinity information. Contacts of the device are matched to reviewers of the content item identified within a content item database associated with the online storefront. Social affinity between matched reviewers, who are also contacts, and the device user is used to prioritize the reviews. The reviews are displayed on the electronic device with an indication of their priority based upon social affinity between the reviewer and the user of the device.

BRIEF DESCRIPTION OF THE DRAWINGS

FIG. 2 is an illustrative drawing of an example data structure for at least a portion of a contacts database stored in a storage device of an electronic device in accordance with an example embodiment;

FIG. 3 is an illustrative drawing of showing information structures stored within storage devices included within a content database in accordance with an example embodiment;

FIGS. 7A-7C are illustrative drawings representing example review information structures for storing individual reviews for a selected content item before and after prioritization of the reviews according to the process of FIG. 6 in accordance with some embodiments;

DETAILED DESCRIPTION OF EXAMPLE EMBODIMENTS

Figure 1:
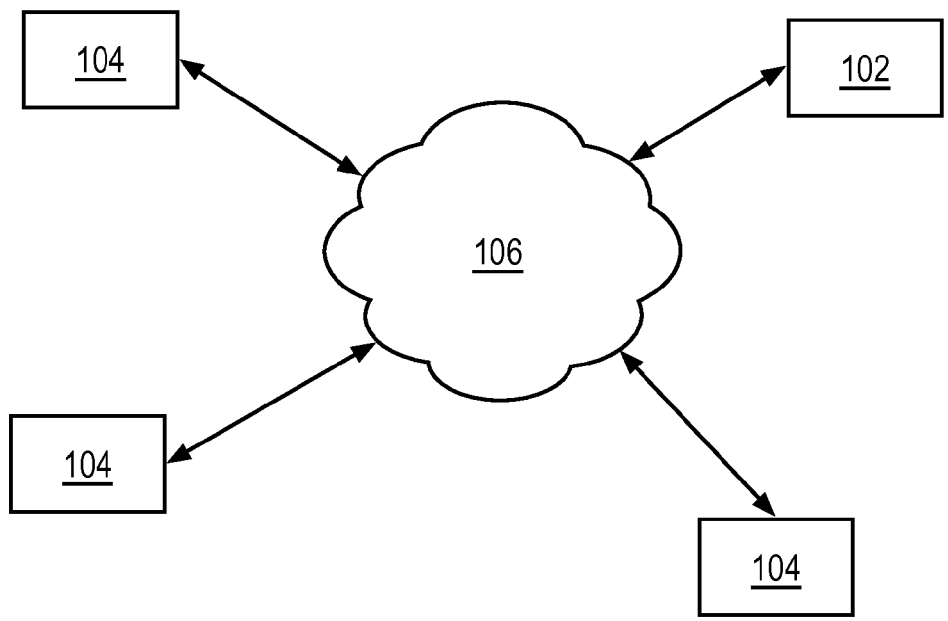
FIG. 1 is an illustrative drawing representing electronic devices coupled to an online storefront by a communications network for obtaining items available at the online storefront.

The following description is presented to enable any person skilled in the art to create and use a method and system to provide prioritized reviews in association with a content item offered within an online storefront. Various modifications to the example embodiments herein will be readily apparent to those skilled in the art, and the principles defined herein may be applied to other embodiments and applications without departing from the spirit and scope of the present disclosure. Moreover, in the following description, numerous details are set forth for the purpose of explanation. However, one of ordinary skill in the art will realize that the present disclosure might be practiced without the use of these specific details. In other instances, well-known data structures and processes are shown in block diagram form in order not to obscure the description of the present disclosure with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present disclosure is not intended to be limited to the example embodiments shown herein, but is to be accorded the widest scope consistent with the principles and features disclosed herein.

Online Storefront

FIG. 1 is an illustrative drawing representing an online storefront 102 and multiple electronic devices 104 that users use to communicate with the online storefront 102 over a communications network 106 such as the internet to download and/or purchase items offered by the store. As used herein, obtaining includes downloading, purchasing, licensing acquiring rights to use a service, etc. As used herein the term electronic device 104 denotes a desktop computer, laptop computer, cellular phone, smartphone, tablet, gaming consoles, or the like. An electronic device 104 makes a request to the online storefront 102 (i.e. to a web server), and in response, the online storefront 102 provides information used by the user device 104 to generate information that is displayed on a display screen of the user device.

An electronoic device 104 uses information delivered by online storefront 102 to generate screen displays that offer products and services to the user. Physical products that are offered by an online storefront 102 may be delivered to users through traditional transport mechanisms such as delivery trucks. Intangible 'content' items such as digital media (music files, video files, electronic images, digital books (ebooks)), or computer software, firmware, and application programs (apps) that are offered by an online storefront 102 may be delivered electronically over the network 106, for example. Application programs are computer programs that are a form of content item that may be offered through online storefronts for downloading over the internet to run on a mobile user device, for example.

Contacts Database and Affinity

An electronic device 104 is associated with a contacts database that is stored in a storage device. The contacts database may be stored within local memory of the electronic device 104 or it may be stored in a remote storage that is accessible over a network. The contacts database identifies the user's contacts information. As used herein, 'contacts' signifies persons or organizations for which information is stored in the contacts database. A contacts database ordinarily provides information about the contacts identified in the contacts database such as the contact's name, phone number, email address, social network address information, physical address and/or other information such as birthdays and comments, for example.

In some embodiments, the contacts database also includes information indicative of a device user's social affinity to persons and/or organizations identified as contacts. As used herein, the term 'social affinity' signifies a measure of the significance or importance of a user's relationship with a person or organization identified in the contacts database relative to other identified persons or organizations. In some embodiments a form of a social graph that provides a pictorial representation of relationships among persons can be employed to represent a user's social affinity to his or her contacts.

Information concerning emails between a user and a given contact is an example of information indicative of a user's social affinity to a given contact. Also, information concerning electronic calendar events involving both the user and the given contact is another example of information indicative of a user's affinity to the given contact. For instance, the number of emails or calendar events or other interactions such as instant messages exchanged or online game matches that involve a given contact may be construed as being indicative of the affinity of that contact to the user. Commonly owned U.S. Patent Application Publication No. 2009/0210391, published Aug. 20, 2009, which is expressly incorporated herein in its entirety by this reference, discloses the use of emails and calendar events to provide a social graph to represent social affinity between a device user and other persons identified in the user's emails and/or calendar events.

Various different criteria for measuring social affinity may be employed. For example, emails and/or calendar events or other interactions that are more recent may be weighted more heavily toward showing a greater affinity. The frequency of occurrence of interactions also may provide a measure of social affinity; the more frequent the interaction the more heavily the interaction may be weighted to show affinity, for example. Some types of interactions may be weighted more heavily than others in determining social affinity. For example, interactions involving personal meetings may weigh more heavily than interactions involving instant messages. Likewise, email correspondence and/or calendar events including a contact that are more frequent may be interpreted as a greater affinity between with the contact. Alternatively, a user may provide explicit preferences as to which persons or organizations have the highest affinity. For example, the user can establish greater affinity with family, friends or groups formed online such as online gaming partners and members of social network communities. Other examples include frequency, duration or recentness of instant messaging conversations, video chat or social networking communication between a user and a contact. Another example is how often a user plays online games with a contact.

FIG. 2 is an illustrative drawing of an example data structure 202 for at least a portion of a contacts database stored in a storage device in accordance with some embodiments. In some embodiments, the data structure includes a name field 204 to associate names of persons who are contacts with metadata about the contact. Metadata fields associated with the name field includes fields such as an employer/organization field 206, address field 208, phone number field(s) 210, and email address field 212, for example. The example metadata also includes fields for social affinity information such as number of emails field 214, a number of calendar events field 216, an email date field 218 and a calendar event date field 220, for example. The affinity information also may include the entire body of the emails and/or contact event records (not shown), for example. In addition, the metadata also may include other personal information about the contact and may include information indicative of communications between the user and the contact over other networks including social networks (not shown). The metadata also may include one or more device identifier field 222 that identify the devices used by the contact to communicate with the user. In addition, the contacts metadata may include information about other online social interaction involving a user such as instant messaging, online gaming activities, social networks (not shown), for example. Thus, a contact may communicate with a user over multiple communication channels, and metadata concerning these communications may be included in the contact database.

Content Database

A content database stores information about content items that can be acquired through an online storefront. An online storefront may offer a plurality of different content items. Millions of users may visit the online storefront to select content items. Many users rely upon reviews provided by other users concerning content items offered through the online storefront in deciding whether to purchase those items. A user may possess multiple devices and may obtain access to different content items to different devices. However, it remains challenging to identify online reviews of an item that an online shopper is evaluating that have been created by persons with whom the shopper has a trust relationship.

FIG. 3 is an illustrative drawing of showing information structures stored within storage devices within a content database 300 in accordance with some embodiments. The content database includes content item structure type 302, user account structure type 304, review structure type 306 and device structure type 308. Each content item data structure type 302 indicates a content item identifier information 301 and is associated with a unique content item review identifier 303. Each user account structure type 304 indicates user account information 305 and is associated with a user account unique identifier 307. Each review structure type 306 indicates review information 309 and is associated with both a unique content item identifier 303 and with a unique user account identifier 307. Each device structure type 308 indicates a device unique identifier 315 and is associated with one or both of a user account unique identifier 307 and one or more content item identifier information 301.

In some embodiments, the content item type 302 provides information about the content item (e.g., display information of the type described below with reference to FIGS. 5A-5B) and an association with a content item indicator that uniquely identifies the content item.

In some embodiments, a user account structure type 304 is associated with a unique identifier of the user account and includes information that identifies the user such as name, email address, telephone number, physical address, social networks the user belongs to, friends of the user and one or more device identifiers, for example. It will be appreciated that a user may possess several devices that he or she uses to interact with an online storefront and user's account may include unique device identifiers for each device. A user account also includes a history of user interaction, e.g., content items downloaded and/or purchase, through the online storefront.

Online reviews of products and services offered for sale through an online storefront can be a significant factor in a consumer's decision as to whether or not to purchase. Some online storefronts provide user interfaces to a review data structure type 306 through which online visitors can provide reviews that are posted online in association with a product or service that is offered through the store. Online reviews typically are displayed in association with an online storefront user interface (UI) display that describes a product or service such as an 'app', song, video or other content item. A review, for example, can be as simple as a 'thumbs up' or a 'thumbs down' symbol to indicate whether a reviewer likes or dislikes an offering. A more nuanced review may indicate a degree of like or dislike through the number of stars displayed next to an item, for example, or may comprise a detailed written narrative to explain the reviewer's recommendation. A product or service may receive numerous reviews, and reviews often are prioritized based upon factors such as the level of credibility or influence possessed by a reviewer. More highly ranked reviews often are displayed before lower ranking reviews.

In general, a content item indicated by a content item identifier 301 can have zero or more reviews associated with it in the content item database 300. In some embodiments, a user is permitted to create only a single review per version of a content item. So if a user writes a review of version 1 of a content item, then that same user also would be permitted to write a review for version 2 of that content item, but ordinarily, would not be permitted to write more than one review for the same version of the content item. In some embodiments, an exception to this rule applies in a situation in which a user has downloaded the same content item on multiple different devices or platforms, In that case the different devices may have different functionality, and a user may be permitted write a review for the same content item with reference to each different device. Another example is where the user is updates a review by writing a follow up. Also a user can change his or her mind and edit a review, thereby changing the review content.

In general, a user can have multiple devices. In some embodiments, each device is identified by a unique identifier that is associated with a device structure type 308 in the content database. The device structure type 308 provides a unique identifier for a user device (e.g., a device PIN) and an association with the user account of the user who owns the device. In some embodiments, a given device information structure 308 also is associated with unique identifiers of content items that have been downloaded from the online storefront to the device.

User Visits Online Storefront and Selects a Particular Content Item

Figure 4:
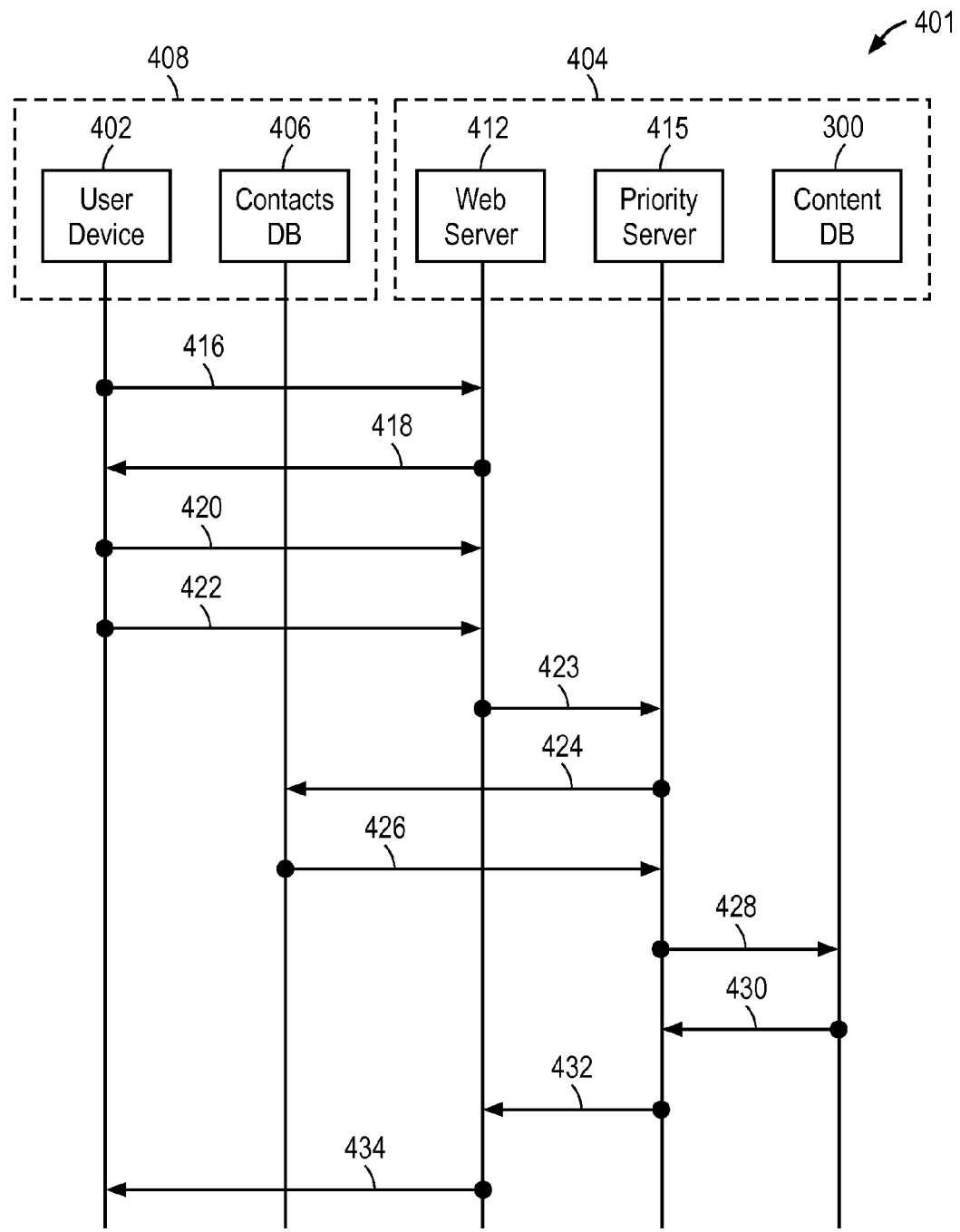
FIG. 4 is an illustrative drawing showing an example of signal flow within a system that includes a mobile device and an online storefront in accordance with an example embodiment.

FIG. 4 is an illustrative drawing showing an example of signal flow within a system 401 that includes an electronic device 402 and an online storefront 404 in accordance with an example embodiment. The signal flow is used to obtain information from a contacts database 406, which is used to prioritize display of reviews stored within the content database 300. The prioritized reviews then can be displayed on a display screen of the user device 402.

The system 401 includes an electronic device 402 and an online storefront 404. Dashed lines 408 indicate that a contacts database 406 is associated with the user of device 402. In some embodiments, contacts database 406 is stored within a storage device disposed on the device 402. In other embodiments, the contacts database 406 is stored remotely within a shared storage device controlled by a storage server (not shown) accessed over a network such as the internet. The online storefront 404 includes a web server 412, a content database 300 and a priority server 415, each of which may be located within the same physical machine or in different physical or virtual machines that communicate over a network. It will be appreciated that in some embodiments the user device 402 and an online storefront 404 communicate over the internet. Moreover, in some embodiments, the web server 412, priority server 415 and content database 300 also may communicate over the internet. As such, signals transmitted between these devices described below comply with the relevant network protocols.

User device 402 sends a request signal 416 over the internet to the online storefront 404. As explained above, in some embodiments, the online storefront includes a web server 412 that sends information in response to requests received over the internet. In response to a user device request signal 416, the online storefront 404 sends a signal 418 to the user device 402 that includes information for use by the user device 402 to generate an online storefront UI displayed on a screen display of the electronic device [reference numeral]. The online storefront UI may include an invitation to login to the online storefront. In response to the login invitation, a user causes the device 402 to send signal 420 that includes login information to the online storefront 404. The login information identifies a user account associated with the user. It will be appreciated that individual signals shown may involve multiple messages. For example, although a single arrow labeled 416 and a single arrow labeled 418 are used to respectively represent a user device request signal sent by a user device 408 and a response signal sent by the web server 412. It will be appreciated that these signals in fact may represent multiple exchanges of information over a network that are used by the electronic device 402 to generate a screen display.

A user can shop or browse within the online storefront to explore information about available items or services. In the course of shopping or browsing within the online storefront 408 in the example shown in FIG. 4, the user causes device 402 to send a signal 422 over the internet to the web server 412 within the online storefront 404 that requests information about a particular content item such as a downloadable application that is available through the online storefront. In some embodiments, the user sends request 422 by selecting (e.g., clicking on) an icon or image representing the content item on the electronic device display screen (not shown).

In response to the request signal 422 the web server 412 sends a request signal 423 to the priority server 415, which responds by sending a signal 424 over the internet to the contacts database 406 to request information about contacts identified in the contacts database 406 associated with the user of device 402. In the illustrated example, an information storage device that includes the contacts database 406 is disposed within the device 402, and therefore, the priority server 415 sends the signal 424 to the device 402. However, in alternative embodiments, a contacts database associated with a user associated with the device 402 may be stored separately from the device 402 at a different network location (not shown), and in that case, the priority server 415 would send the request signal 424 to the remote storage server over the internet, for example. Requested contacts database information obtained from the contacts database 406 is sent over the internet via signal 426 to the priority server 415. As explained more fully below, in some embodiments, the contacts database information provided by signal 426 identifies persons who the user of device 402 knows and also provides social affinity information associated with identified persons in the content database.

Also, in response to the request signal 423, the priority server 415 sends a signal 428 to request certain content item information associated with the content item identified in the user device request 422. In some embodiments the content item database 300 is implemented as a storage server that serves information to the online storefront web server 404. Requested content item database information obtained from the content database 300 is sent via signal 430 to the priority server 415. In this example, the content item information includes reviews that have been provided by others about the content item that the user requested information about through signal 422.

The priority server 415 uses the contact information obtained via signals 424, 426 to process the content item information obtained via signals 428, 430. More specifically, in some embodiments the priority server 415 prioritizes reviews within the content database 300 based upon affinity information within the contacts database 406. The contacts sever sends the processed content item information to the web server 412 via signal 432 for delivery to the user device 402.

The online storefront web server 412 sends signal 434 that includes information used by the device 402 to produce screen display images for the requested content item. In some embodiment, the information provided by the online storefront enables 404 via signal 434 is used by the device 402 to display reviews that have been obtained from the content item database 300 for the content item. Furthermore, in some embodiments, the information provided via signal 434 is used to produce a UI screen display that permits a user to selectively display reviews, e.g., by scrolling through the reviews. The display of these reviews is prioritized to provide reviews by persons whom the user knows, as indicated by social affinity information in the contacts database 406, ahead of other reviews. Moreover, in some embodiments, reviews of persons whom the user knows are further prioritized so that reviews by persons with whom the user has a greater social affinity, as determined by the priority server 415, are prioritized ahead of reviews with which the user has a lesser affinity.

It will be appreciated that although the priority server 415 is shown to operate as a component of the online storefront 404, persons skilled in the art will appreciate that alternatively, the electronic device 402 can be configured to implement the functionality of the priority server.

Prioritization of Reviews of Selected Content Item

Figure 5A:
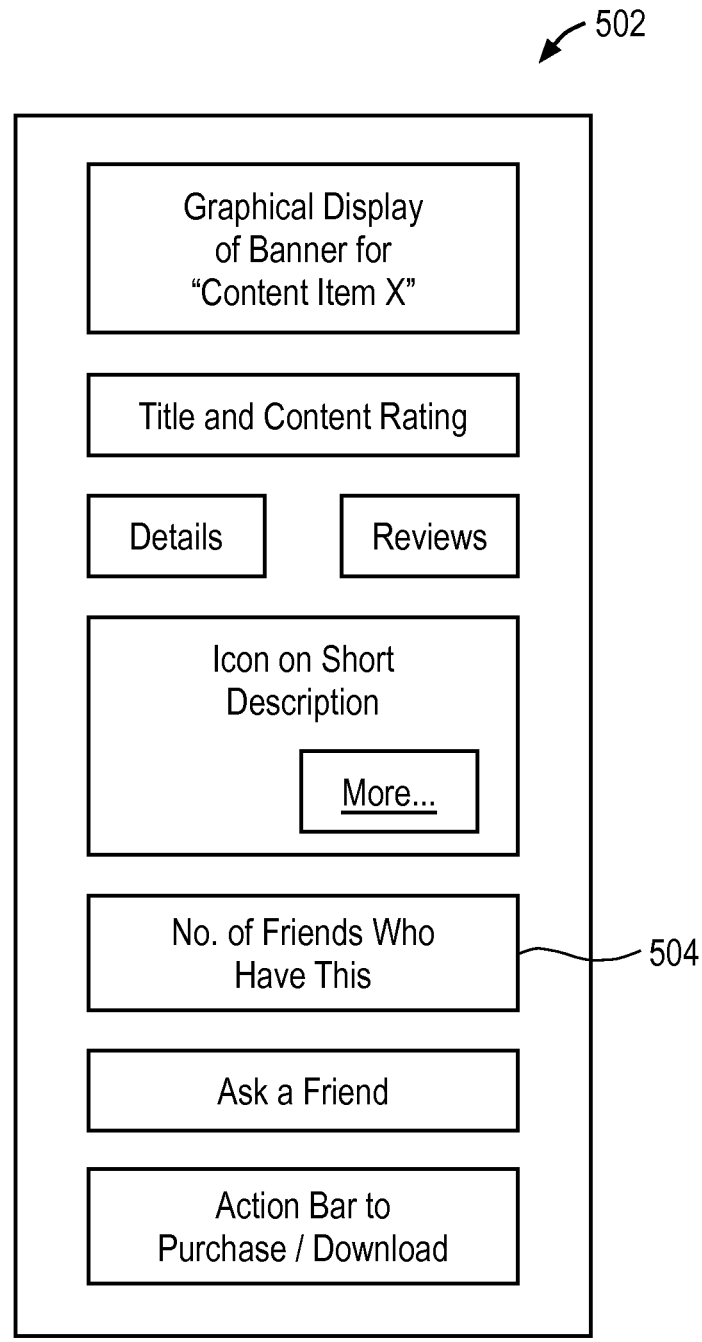
FIGS. 5A-5B are illustrative drawings of a first and second display screen of an electronic device that show information for an illustrative 'content item X' before (FIG. 5A) and after (FIG. 5B) a user requests display of reviews in accordance with some embodiments.
Figure 5B:
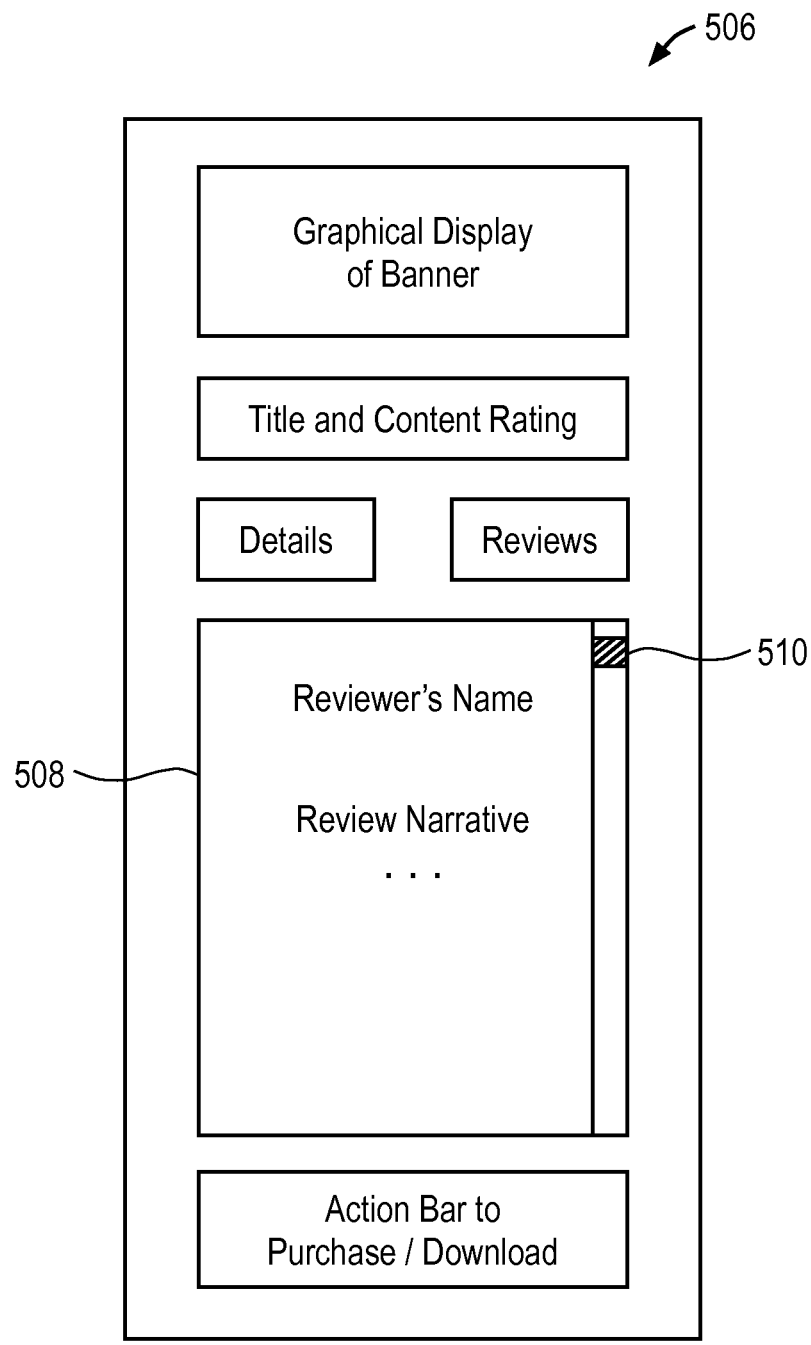

FIGS. 5A-5B are illustrative drawings of a user first and second device screen displays that show information for an illustrative 'content item X' before (FIG. 5A) and after (FIG. 5B) a user requests reviews in accordance with some embodiments. The user device generates the screen display, which may comprise an HTML page, in response to content item information provided by the online storefront via signal 434 described above with reference to FIG. 4. The screen displays typically include text and images to describe the content item and the terms of its use, although these are not shown in order to avoid unnecessary detail. In some embodiments, multiple different screen displays relating to a given content item may be displayed selectively in response to successive user device requests for additional information. For example, the screen displays may include active regions such as the 'Details' field and the 'Reviews' field that provide links to additional information relating to the content item that is the subject of the display. This additional information may be provided by the web server 412 upon request from the user device 402. Signals involved in these additional device requests and web server responses are not shown in FIG. 4 in order to avoid unnecessary detail. In some alternative embodiments, a screen display may show multiple different content items together with information indicating how many of a user's contacts have purchased a copy of each displayed content item, for example.

The first illustrative screen display 502 shown in FIG. 5A includes a first display field 502 to indicate in the number of contacts from the device user's associated contacts database determined by the priority server 415 to have a copy of the given content item loaded on his/her device. The second illustrative screen display 506 depicted in FIG. 5B includes a second display field 508. A user navigates from the first screen display 502 to the second screen display 506 by selecting the "Reviews' region of the first screen display 502. Some reviews are prioritized according to social affinity of the reviewer to the user associated with the device 402 as determined by the priority server 415. In some embodiments the second display field 508, which shows reviews and indicates the identity of the reviewers through their names, online 'handles' or pictures, or other identifying information, for example, is scrollable so that a user can scroll through a list of reviews. The second display field includes a scroll bar 510, although in some embodiments scrolling is achieved by a gesture such as swiping the screen thus obviating the need for a scroll bar.

Figure 6:
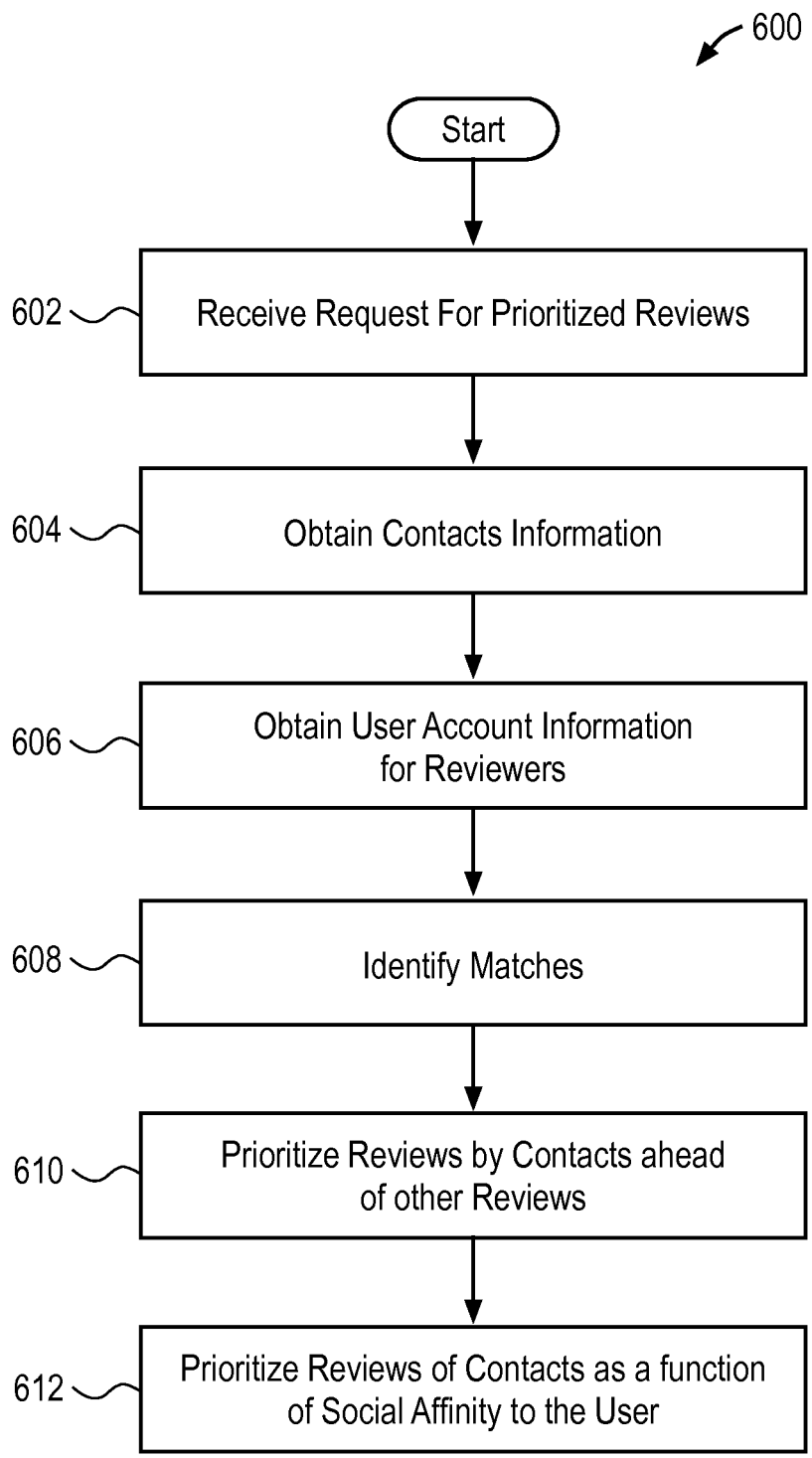
FIG. 6 is an illustrative flow diagram of a process performed by the priority server to prioritize presentation of content item reviews within the display screen as a function of contact information in accordance with an example embodiment.

FIG. 6 is an illustrative flow diagram of a process 600 performed by the priority server 415 to prioritize presentation of content item reviews within the display screen as a function of contact database information associated with a device user in accordance with some embodiments. More specifically, computer program code stored in non-transitory storage configures a computer system to implement the prioritization server 415, which performs the process 600. In some embodiments, the priority server 415 shares resources (e.g., one or more processors and non-transitory memory) used to implement the web server 412, for example. The flow diagram of FIG. 6 includes multiple blocks that represent configuration of the computer system in accordance with program code to perform the acts indicated for the modules.

Figures 7A, 7B, 7C:
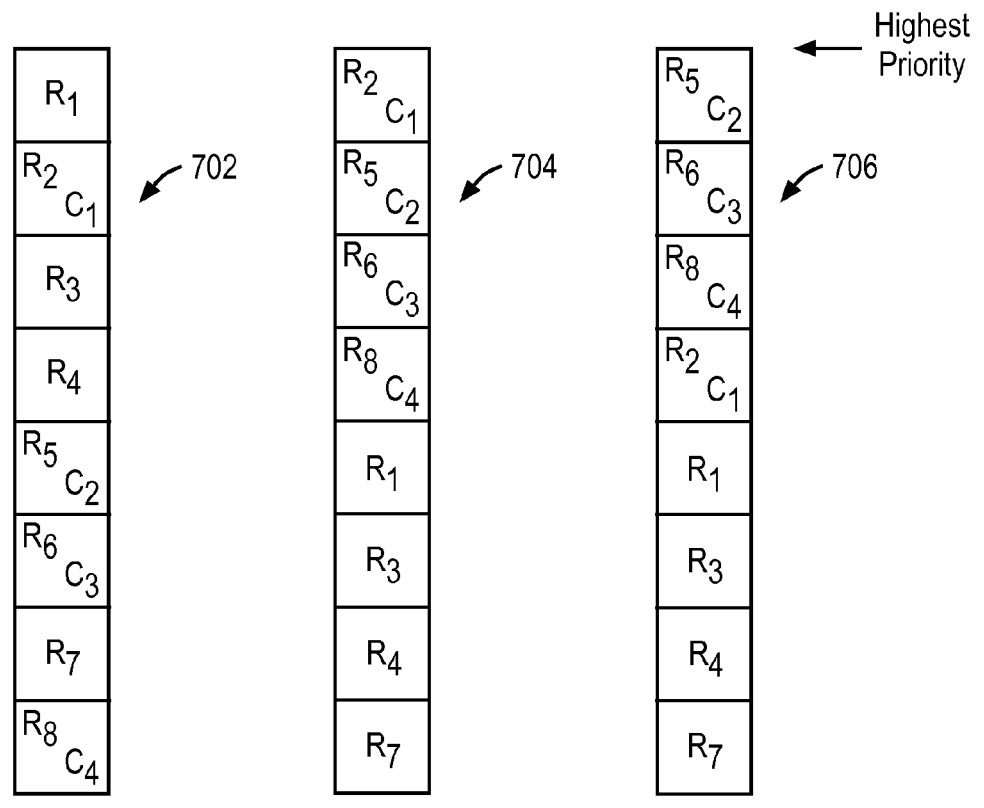

FIGS. 7A-7C are illustrative drawings representing example reviews information structures used to store individual reviews for a selected content item within a non-transitory memory before and after prioritization of the reviews according to the process 600 in accordance with some embodiments. In this example content item has received reviews $R_1$ through $R_8$. The structure of the reviews information structures determines the priority of the reviews and the order of their presentation within the second display field 408 of the screen display in FIG. 5B.

Referring to FIG. 6, in block 602, a request for prioritized reviews is received via signal 423. In block 604, certain contact information represented in FIG. 2 associated with the device user is obtained from the contacts database 406 via signals 424, 426. In some embodiments, the obtained contact information includes device identifiers associated with persons identified within the device user's contacts database. In block 606, certain content item information represented in FIG. 3 is obtained from the content item database 300 via signals 428, 430. In block 608, a determination is made as to which, if any, contacts within the obtained contact information match user account information of reviewers identified within the obtained content information as having reviewed the content-item indicated by the user device in signal 422. It will be appreciated that reviewers are associated in the content database 300 with their user accounts, and that the reviewers' user accounts contain information, such as unique device identifiers, for example, that can be used to associate a reviewer's user account with a contacts associated with the user of device 402.

Referring to FIG. 7A, there is shown an illustrative first reviews information structure 702 that associates reviews of a selected content item prior to performance of the matching identification act of block 610. The example first reviews information structure 702 orders the reviews so that review $R_1$ is the first review that would be presented to the user of device 402, and Review $R_8$ is the last review presented. Reviews shown in FIG. 7A that contain the additional label $C_1$ to $C_4$ are reviews that have been created by persons identified in the obtained contact information. It will be appreciated that the first reviews information structure 602 accords no special priority to reviews by persons who are contacts of the user associated with the device 402.

In block 610, the first data structure 702 represented in FIG. 7A is transformed to a second data structure 704 represented in FIG. 7B in which reviews by reviewers who are contacts of the user of the device 402 are prioritized ahead of other reviews. In FIG. 7B, reviews are prioritized such that reviews that have an additional label $C_1$ to would be presented to the user of device 402 before the other reviews would be presented. In other words, associations in non-transitory storage among reviews of the selected content item are changed to prioritize presentation of reviews by persons who are contacts of the user associated with the device 402 before other reviews of the content item.

In block 612, the second data structure 704 represented in FIG. 7B is transformed to a third data structure 706 represented in FIG. 7C in which reviews by reviewers who are contacts of the user of the device 402 are prioritized ahead of other reviews and also are prioritized according to the reviewer's affinity to the user associated with the device 402. As explained above, a variety of different criteria can be used for measuring affinity such as number, frequency or recentness of emails and/or calendar events, for example. In this example, the block 612 determines that the user associated with the device 402 has the greatest affinity to the reviewer who created the review labeled with $C_2$ followed by reviews bearing labels $C_3$, $C_4$ and $C_1$, respectively. Thus, the third reviews information structure 706 organizes the reviews such that the review containing label $C_2$ is presented to the user first followed in order by reviews bearing labels $C_3$, $C_4$ and $C_1$.

Figure 8:
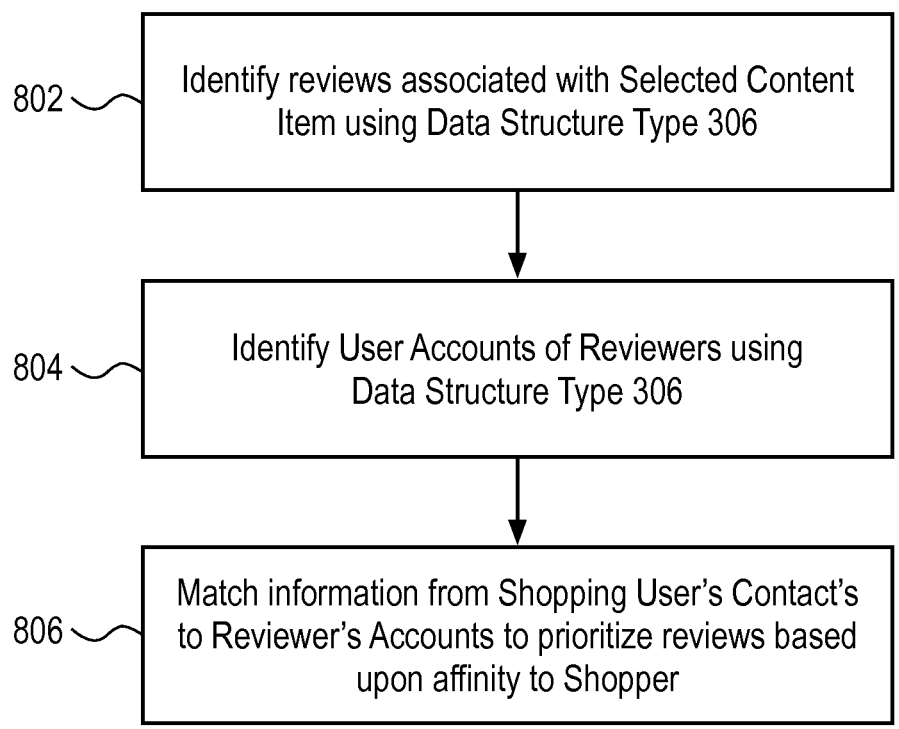
FIG. 8 is an illustrative drawing showing additional details of the act of matching contact information with reviews in accordance with some embodiments.

FIG. 8 is an illustrative flow chart showing additional details of the act of matching contact information with reviews in accordance with some embodiments. In block 802, data structure type 306 is used to identify reviews in the content database that are associated with a unique identifier of a content item that is of interest to the user of device 402. Each review of data structure type 306 in the content database also is associated with a unique identifier of the user account 307 of the user who created the review. Block 804 uses the review data structure type 306 to identify user accounts 307 associated with reviewers who created the reviews. Block 806 matches information in the identified reviewer user account with information in the contacts database 406 of the user of device 402 to identify reviewers who also are contacts of the user of device 402.

Hardware Environment

Figure 9:
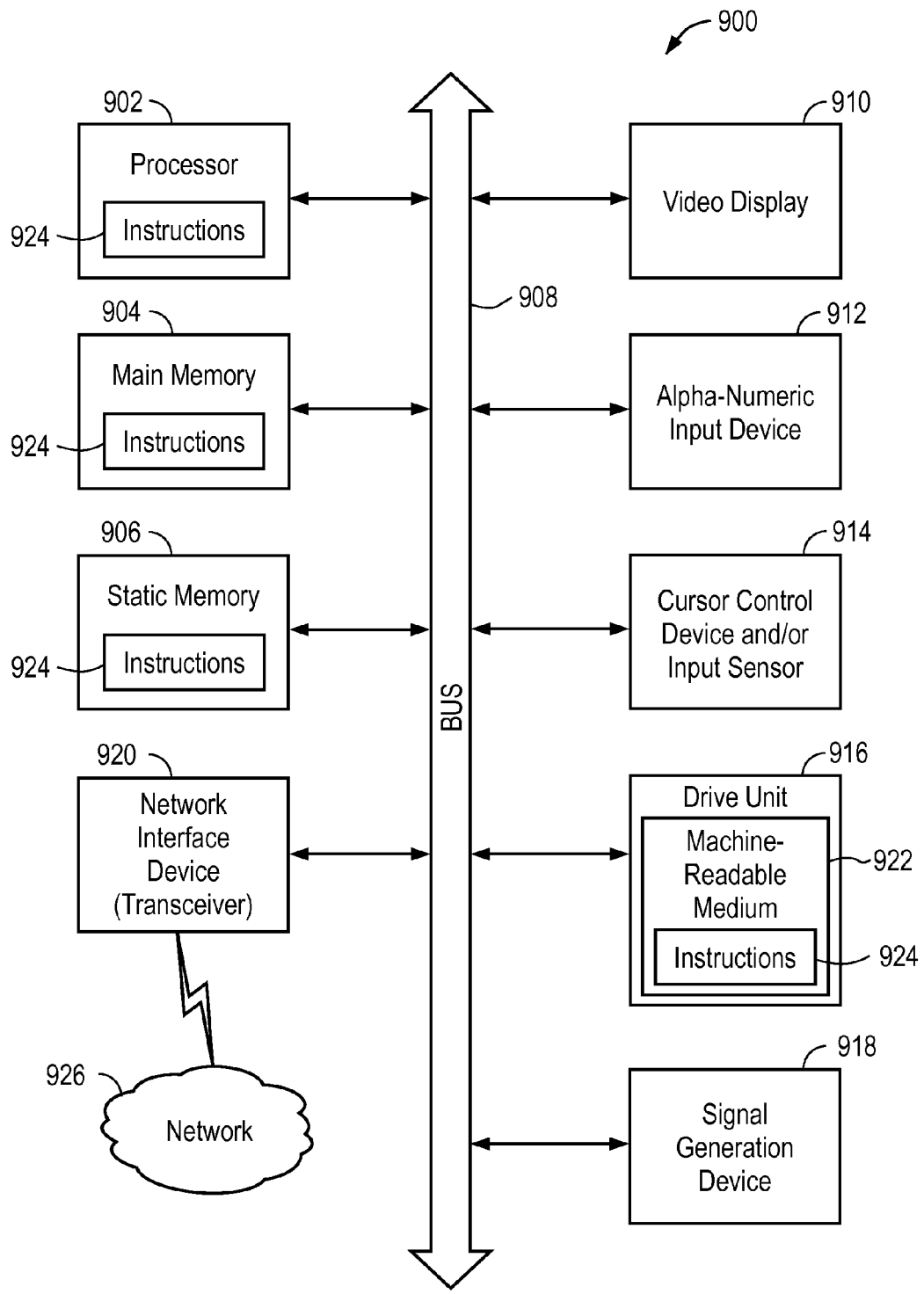
FIG. 9 shows an illustrative diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. The computer system 900 can comprise, for example, any of the user device 402, server 412, and/or server 415. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., liquid crystal display (LCD), organic light emitting diode (OLED) display, touch screen, or a cathode ray tube (CRT)). The computer system 500 also includes an alphanumeric input device 912 (e.g., a keyboard, a physical keyboard, a virtual keyboard using software), a cursor control device or input sensor 914 (e.g., a mouse, a trackpad, a trackball, a sensor or reader, a machine readable information reader, bar code reader), a disk drive unit 916, a signal generation device 918 (e.g., a speaker) and a network interface device or transceiver 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 500, the main memory 504 and the processor 902 also constituting machine-readable media.

The software 924 may further be transmitted or received over a network 526 via the network interface device 920.

While the machine-readable medium 922 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method to display prioritized reviews on a display of a mobile electronic device, the method comprising:
sending from a mobile electronic device a request over a network to an online storefront for content item information relating to a content item;
receiving at the mobile electronic device over the network from the online storefront the requested content item information, wherein the received content item information includes reviews of the content item and indications of identities of a plurality of reviewers who provided the reviews;
retrieving contacts information from a contacts database maintained within a memory of the mobile electronic device, wherein the contacts information indicates identities of contacts identified in the contacts database;

sending over the network from the mobile electronic device to the online storefront the retrieved contacts information;

receiving at the mobile electronic device over the network from the online storefront indications of matches between a plurality of contacts identified in the contacts information and the plurality of reviewers indicated in the content item information;

determining, at the mobile electronic device, a priority of the reviews of the content item, the priority based at least partially upon a respective social affinity between a matched respective reviewer in the plurality of reviewers and a user of the mobile electronic device; and displaying, on the mobile electronic device, the reviews of the content item based on the determined priority.

2. The method of claim 1,
wherein the indication of the determined prioritization includes a displaying of reviews by reviewers who are identified in the contacts database ahead of reviews by reviewers who are not identified in the contacts database.

3. The method of claim 1,
wherein determining priority of received reviews as a function of social affinity indicated in the contacts information includes determining social affinity at least in part as a function of frequency of interaction indicated in the contacts database between a user of the device and respective contacts in the contacts database.

4. The method of claim 1,
wherein determining priority of received reviews as a function of social affinity indicated in the contacts information includes determining social affinity at least in part as a function of recentness of interaction indicated in the contacts database between a user of the device and respective contacts in the contacts database.

5. The method of claim 1,
wherein determining priority of received reviews as a function of social affinity indicated in the contacts information includes determining social affinity at least in part as a function of number of interactions indicated in the contacts database between a user of the device and respective contacts in the contacts database.

6. The method of claim 1,
wherein determining priority of received reviews as a function of social affinity indicated in the contacts information includes determining social affinity at least in part as a function of type of interaction indicated in the contacts database between a user of the device and respective contacts in the contacts database.

7. The method of claim 1,
wherein the contacts information sent over the network from the electronic device to the online storefront that indicates identity of contacts includes unique device identifiers of one or more of the contacts.

8. The method of claim 1 further including:
receiving over the network from the online storefront by the electronic device an indication of contacts who have the content item; and
displaying on the device UI an indication of the number of contacts who have the content item.

9. The method of claim 1,
wherein determining priority of received reviews includes determining by the electronic device as a function of social affinity indicated in the contacts information database between a user of the device and contacts indicated by the received indications of matches as matching reviewers of the content item.

10. A method to generate prioritized reviews of a content item offered through an online storefront and accessible through a user interface (UI) display of a mobile electronic device, the method comprising:

receiving a request over a network from a mobile electronic device to an online storefront for content item information relating to a content item;

receiving over the network from the mobile electronic device by the online storefront contacts information obtained from a contacts database maintained within a memory of the mobile electronic device, wherein the contacts information includes information identifying contacts of a user of the mobile electronic device and information indicating a social affinity between the user of the mobile electronic device and a plurality of the identified contacts;

obtaining from a content information database the requested content item information including reviews of the content item and indications of identities of a plurality of reviewers who provided the reviews;

determining matches between one or more contacts identified in the sent contacts information and one or more reviewers indicated in the obtained content item information;

determining, by the online storefront, a priority of at least some of the matched reviewers as a function of social affinity indicated in the contacts information between the user of the mobile electronic device and the matched reviewers of the content item;

sending over the network from the online storefront to the mobile electronic device the requested content item information, wherein the content information includes prioritized reviews of the content item and indications of identities of a plurality of the reviewers who provided the reviews.

11. The method of claim 10,
wherein determining priority of reviews as a function of social affinity indicated in the contacts information includes determining social affinity at least in part as a function of frequency of interaction indicated in the contacts database between the user of the device and respective contacts in the contacts database.

12. The method of claim 10,
wherein determining priority of reviews as a function of social affinity indicated in the contacts information includes determining social affinity at least in part as a function of recentness of interaction indicated in the contacts database between the user of the device and respective contacts in the contacts database.

13. The method of claim 10,
wherein determining priority of reviews as a function of social affinity indicated in the contacts information includes determining social affinity at least in part as a function of number of interactions indicated in the contacts database between a user of the device and respective contacts in the contacts database.

14. The method of claim 10,
wherein determining priority of reviews as a function of social affinity indicated in the contacts information includes determining social affinity at least in part as a function of type of interaction indicated in the contacts database between a user of the device and respective contacts in the contacts database.

15. The method of claim 10,
wherein the contacts information received over the network by the online storefront from the electronic device that indicates identity of contacts includes unique device identifiers of one or more of the contacts.

16. The method of claim 10 further including:
sending over the network by the online storefront to the electronic device an indication of contacts who have the content item.

17. A method to display prioritized reviews on a user interface (UI) of a mobile electronic device, the method comprising:
sending a request over a network from a mobile electronic device to an online storefront for content item information relating to a content item;
sending over the network by the online storefront to the mobile electronic device the requested content item information, wherein the sent content information includes reviews of the content item and indications of identities of a plurality of reviewers who provided the reviews;
retrieving contacts information from a contacts database maintained within a memory of the mobile electronic device, wherein the contacts information indicates identities of contacts identified in the contacts database;
sending over the network from the mobile electronic device to the online storefront the retrieved contacts information;
determining matches between one or more contacts identified in the sent contacts information and one or more reviewers indicated in the obtained content item information;
sending over the network from the online storefront to the mobile electronic device indications of matches between one or more contacts identified in the sent contacts information and one or more reviewers indicated in the received content item information;
determining a priority of received reviews as a function of social affinity indicated in the contacts information database between the user of the mobile electronic device and contacts indicated by the received indications of matches as matching reviewers of the content item; and
displaying the reviews on the UI of the mobile electronic device with an indication of the determined prioritization.

18. The method of claim 17,
wherein determining matches is performed by the electronic device.

19. The method of claim 17,
wherein determining matches is performed by the online storefront.

* * * * *